FIG. 1

ROSCOE W. MITCHELL, JR. INVENTOR.

BY John D. Gassett
ATTORNEY

May 17, 1966  R. W. MITCHELL, JR  3,252,148
CLOCKING SYSTEM
Filed Aug. 3, 1962  5 Sheets-Sheet 3

FIG. 3
FIG. 3a
FIG. 3b

ROSOE W. MITCHELL, JR. INVENTOR.
BY John D. Gassett
ATTORNEY

United States Patent Office 3,252,148
Patented May 17, 1966

3,252,148
CLOCKING SYSTEM
Roscoe W. Mitchell, Jr., Tulsa, Okla., assignor, by mesne assignments, to Esso Production Research Company, Houston, Tex., a corporation of Delaware
Filed Aug. 3, 1962, Ser. No. 214,547
6 Claims. (Cl. 340—172.5)

This invention concerns the processing of seismic data. It relates especially to a clocking system in the processing of digitally recorded data.

Geophysical prospecting using artificially induced seismic disturbances has found wide application in the search for petroleum and other products. It is the general practice to initiate a seismic disturbance at a point near the surface of the earth to direct seismic waves downwardly into the earth from that point. The waves continue to travel downwardly within the earth until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from a seismic disturbance point, it is possible to detect the arrival of the reflected seismic waves at the surface of the earth. These detected waves are translated into electrical impulses which are then indicative of the character of ground motion and are usually referred to collectively as a seismic signal. The seismic signal is in effect a composite signal made up of a plurality of signals varying in frequency and amplitude.

It has recently become desirable to record such seismic signals in digital form on magnetic tape. In a preferred system, the signals from the different geophone locations are sequentially sampled, converted to binary digits representing the signal amplitude and polarity at the instant of sampling, and recorded in this digital form on magnetic tape. The process of sequentially sampling a number of signals and transmitting or recording them on a common medium is commonly known as commutating or multiplexing. The process of converting amplitude information into binary digits is referred to as digitizing the data. The plurality of binary digits representative of a single data point are commonly referred to collectively as a digital data word.

At a later convenient time the digital data words are separated so as to bring together the data from each particular geophone location. This process, commonly known as decommutation, is performed for convenience in processing the data on a digital computer. It is further found desirable to break the data from each geophone location into blocks of some specified number of data words, for example blocks of 256 words. These blocks are recorded on magnetic tape and are separated by a gap therebetween containing a block identifying code which aids the digital computer in searching for any particular block of data during computation. The number of such blocks of data recorded in shooting or surveying a medium sized geographical area runs tremendously high. For example, in running a survey line 30 miles long, the number of blocks thus recorded may be as high as 70,000 or more.

In a preferred embodiment the digitized seismic information stored on a magnetic tape is processed on a digital computer. There are two broad classes of digital processing devices, serial and parallel. In a serial device, a digital word is transmitted serially in a train, one bit at a time. In a parallel device, however, the bits of a digital word are transmitted all at the same time. The digital words are recorded on the magnetic tape in parallel form. Likewise, a magnetic core memory for storing the digital data for use by a computer is a parallel device. Digital computers may be either serial or parallel, but in general the serial computers are more simple and thus less expensive. Therefore, it is frequently desirable to use a serial computer for applications as described heretofore. Since magnetic core memories in general provide fast access to data stored therein, they are frequently used in conjunction with a serial computer. To use a serial computer with a parallel core memory or with the parallel data from a magnetic tape, a shift register is required. A common form of a shift register is a plurality of flip-flops or other bistable devices so interconnected that they can be used for converting serial data to parallel form, and parallel data to serial form. Although it is convenient to have the data on the magnetic tape recorded in blocks as heretofore described, it is sometimes desired to enter the data into the serial computer (or output device such as a chart recorder) in a continuous stream of words without a gap between blocks of data words. This invention provides a system of clocking or gating the memory unit so that this desired result is achieved.

In particular this invention concerns a unique clocking system. It includes a clock 1 which has a plurality of pulses which are used for giving commands to a portion of a computer system. It includes a second clock which has another group of pulses which are used for another set of commands to the same part of the computer system. To make proper use of certain portions of computer systems it is desired to use both the train of pulses of clock 2 and the train of pulses of clock 1 during an operation of the computer system. In the operation contemplated, it is required that the pulses of the first clock occur at a time different from the pulses of the second clock and separated therefrom by some minimum time. This system makes use of a master clock, which is usually a part of a computer, to obtain this result. The system includes first means to reform and delay as necessary the pulses of clock 1 such that its pulses occur during the occurrence of pulses of one polarity of the master clock. Second means are provided to reform and delay as necessary the pulses of clock 2 such that each pulse of clock 2 occurs during the occurrence of a pulse of the other polarity of the master clock. Thus, the pulses of clock 1 and the pulses of clock 2 do not and cannot occur simultaneously. Further, the time of occurrence of these pulses is controlled so that they will be separated in time by at least a certain minimum amount.

A complete understanding of the invention and its objects will be apparent from the following description taken in conjunction with the drawing in which:

FIG. 2, being composed of FIG. 2a and FIG. 2b, illustrates a clocking system for use in gating the memory of the system of FIG. 1 using a master clock, an independent clock and a clock which is dependent on the master clock;

FIG. 3, being composed of sections

Figure 1:
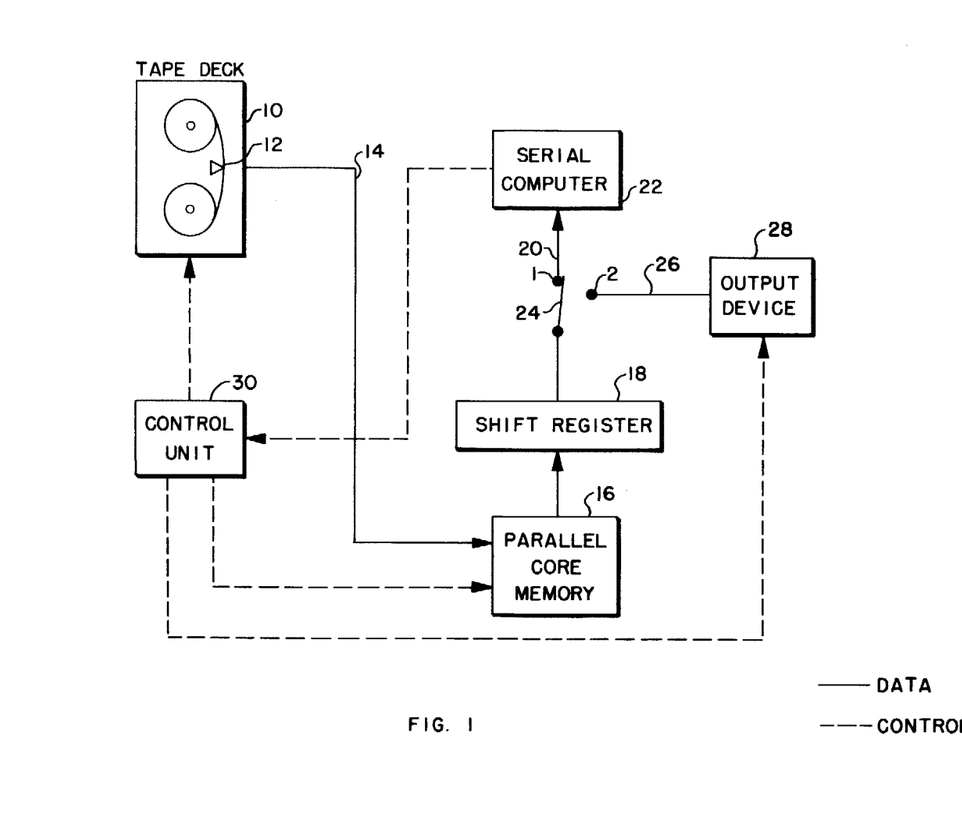
FIG. 1 illustrates in schematic form the components for taking digital data from a magnetic tape through a parallel core memory and shift register to a serial computer.

Turning now to the drawing and FIG. 1 in particular, there is illustrated a magnetic tape deck 10, containing a magnetic tape 12 upon which seismic information has been stored in ditigal form. Wel known reproducing means for reproducing the digital information from tape 12 is connected through circuit 14 to parallel core memory 16 in a conventional manner. Data information on the magnetic tape deck is stored in parallel form. This information is transferred to the core memory in parallel form. The parallel information from the core memory is passed through shift register 18 which converts the parallel information into serial information and is fed through circuit 20 to serial computer 22. Circuit 20 has a two-position switch 24. Switch 24 when it is in one position passes information to serial computer 22. When switch 24 is in its number two position, it passes information from shift register 18 through circuit means 26 to output device 28 which can, for example, be a chart recorder. It is obvious that switch 24 can be a manually controlled switch as shown or electronically controlled to permit operation at high rates of speed. A control unit 30 is provided. This control unit directs magnetic tape deck 10 to read a digitally recorded word. It also directs parallel core memory 16 to transfer a word to shift register 18. It is desirable to operate the digital equipment of FIG. 1 from two separate clocks, i.e., two trains of timing pulses which are independent and not synchronized. As indicated above, an example of this type operation is the entering of data from the pre-recorded magnetic tape 12 into core memory 16 during the time that data already entered into the core memory is being transferred through shift register 18 to serial computer 22. Because of speed variation and other factors in the tape deck system it is usually not feasible to synchronize the tape data clock with the computer clock or for that matter with the control clock of output device 28. This invention shows a system for using two independent clocks without interference of one by the other.

Figure 4:
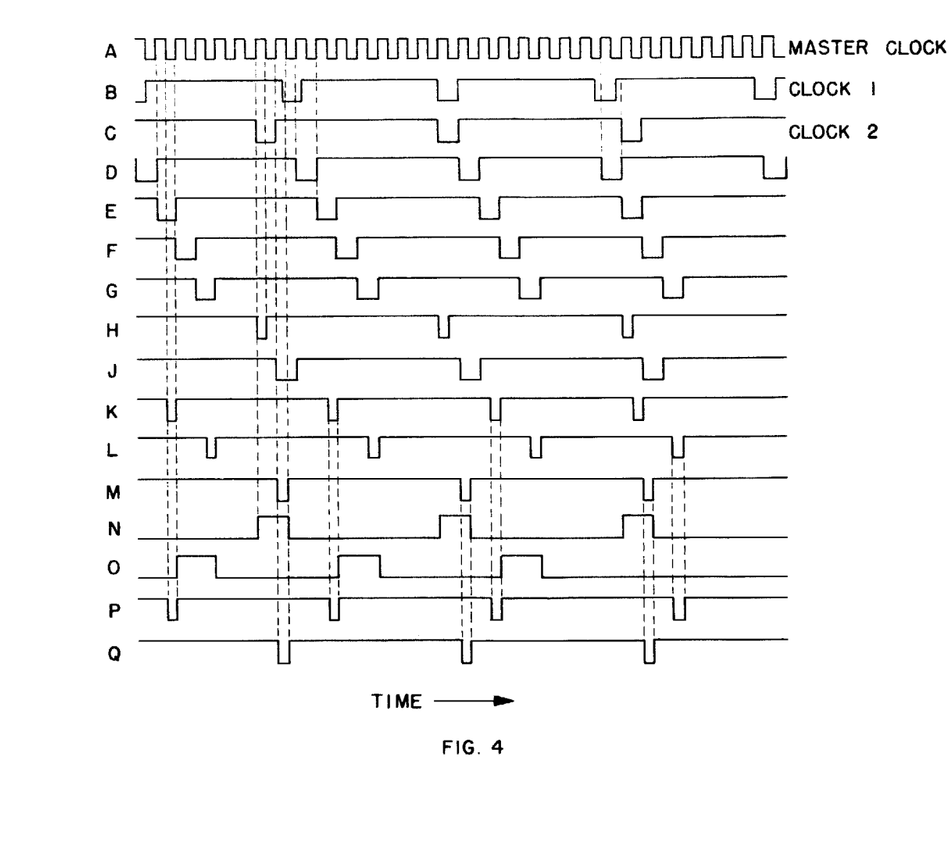
FIG. 4 illustrates various waveforms which occur at various points in the clocking system of FIG. 2.

Attention is now directed to FIG. 2, which illustrates a master clock 32, clock 1 which is designated by the reference numeral 34, and clock 2 which is designated by the reference numeral 36. Clock 1 is completely independent of master clock 32. Clock 2 is dependent on master clock 32. The output of master clock 32 is fed through a frequency divider 38, for example, to obtain clock 2. In FIG. 4, the output of clock 1 is illustrated as waveform B, the output of master clock 32 is illustrated as waveform A and the output of clock 2 is illustrated by waveform C. Typical pulse rates used in this system are 200 kc. for the master clock, 12 kc. for clock 1 and 10 kc. for clock 2. For this system to function properly the pulse rate for the master clock should be about 20 times the pulse rate of either clock 1 or clock 2. Clock 1 and the master clock are independent. Clock 2 has been obtained by dividing down from the master clock so that it already bears some fixed relationship to the master clock. This is a normal situation for removing or unloading data from the core memory as controlled by a computer or similar digital device. The data being loaded into the core memory is from a magnetic tape having a separate clocking system.

In the discussion explaining this system, the logic used for illustrative purposes is what is commonly known as the "negative logic"; i.e. "on" or "true" state is represented by the more negative of two voltage levels, while the "off" or "untrue" state is the more positive of the two voltages (usually at or near zero voltage or ground level). An "and" circuit or gate is of a character that it requires an "on" signal to each of its plurality of inputs in order for its outputs to be "on." An "or" circuit or gate is of a character that an "on" signal to any one or any combination of its plurality of inputs causes it output to be "on."

An inverter as used herein is a circuit means which changes "on" state to an "off" state, and vice versa. The flip-flops used are of the type which have separate "set" and "reset" inputs indicated by the symbols "S" and "R," respectively, in the drawing. The flip-flops can for example be bistable multivibrators. A positive going waveform on the "set" input will trigger the flip-flop so that the output is "on." It will remain in this state until a positive going waveform or pulse is applied to the "reset" input at which time the output is turned to the "off" state. Flip-flops commonly have two separate outputs, one as described, and the other an inverted form. The former is traditionally called the "true," "set," or "1" output, and the latter is called the "untrue," "reset," or "0" output. The flip-flops used herein are further of a type having the "set" input "and" gated internally by cross-connection to the "0" output, and the "reset" input "and" gated similarly to the "1" output. This type of cross-connection overcomes the apparent paradox of what happens to the flip-flop if simultaneous triggering pulses are applied to both set and reset inputs. It is obvious that if the "1" output is in the "on" state, the "0" output will be in the "off" state, and the pulse on the "set" input will be inhibited while the pulse on the "reset" input will be allowed to pass to reset the flip-flop.

Figure 2A:
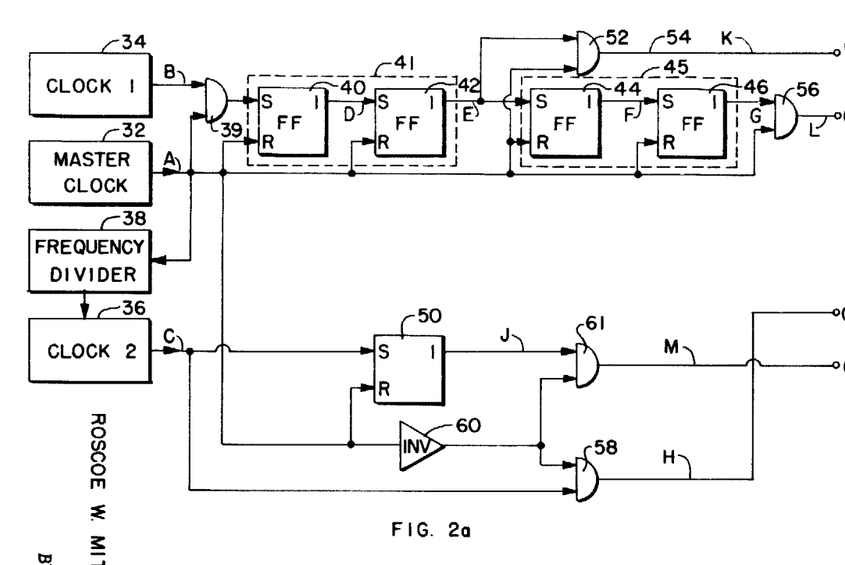

Illustrated in FIG. 2a are flip-flops 40, 42, 44, 46, and 50. The output of clock 1 (34) is connected to "and" circuit 39 whose output is connected to the set input of flip-flop 40. The second input of "and" circuit 39 is connected to the master clock. Clock 1, as illustrated, is so designed that the clock pulse therefrom is of a duration slightly shorter than the time for one complete cycle of the pulse train of the master clock. This arrangement assures a pulse at the output of flip-flop 40 of sufficient duration for satisfactory triggering of the following flip-flop 42. The master clock 32 is electrically connected to the reset input of each flip-flop in FIG. 2a.

The output of flip-flop 40 is connected to the "S" input of flip-flop 42. The output of flip-flop 42 is connected to the input of flip-flop 44 and to "and" circuit 52. The output of master clock 32 is also connected to "and" circuit 52. The "and" circuit is of a character that it takes both an input from flip-flop 42 and from master clock 32 for it to have an output on conduit 54. The output of flip-flop 44 is connected to the "S" input of flip-flop 46. The output of flip-flop 46 is connected to "and" circuit 56. Also connected to one of the inputs of "and" circuit 56 is the output of master clock 32. "And" circuit 56 is similar to "and" circuit 52, i.e., it requires an input pulse on each of the inputs at the same time to have an output pulse. As will be seen, flip-flops 40 and 42 can be called a delay unit 41 and flip-flops 44 and 46 can be termed a delay unit 45 since they effectively delay the time of occurrence of the clock pulses from clock 1.

The output of clock 2 (36) is fed or is electrically connected to the "S" input of flip-flop 50 and to one of the inputs of "and" circuit 58 which is similar to "and" circuits 52 and 56. Clock 2 is so designed that the output pulse duration is equal to and coincident with a complete cycle of the master clock pulse train. The output of master clock 32 is also electrically connected to an inverter 60. This inverter is an electrical circuit means which changes an "on" state to an "off" state, and vice versa. The output of inverter 60 is fed to one of the input "and" circuits 58 and to one of the inputs to another "and" circuit 60 which is similar to "and" circuit 58. The output of flip-flop 50 is connected to one of the inputs to "and" circuit 60.

Having briefly described the components of FIG. 2a, attention will now be directed toward an explanation of how the circuit operates to obtain "intermediate clocks" 1a, 1b, 2a, and 2b. In this regard, reference is made to waveforms illustrated in FIG. 4. The output of clock 1 is applied to the "S" input of flip-flop 40 through "and" circuit 39. The trailing edge of these pulses turns flip-flop 40 "on" at a time coincident with a positive-going portion of the master clock. The next positive-going portion of the master clock (see waveform A), which is a symmetrical or square wave having equal duration of positive and negative half-cycles and which is many times the frequency of either clock 1 or clock 2, will trigger flip-flop 40 "off." Flip-flop 42 is then turned on by the trailing edge of the pulse from flip-flop 40 which is illustrated as waveform D. The next positive-going portion of the master clock output will turn flip-flop 42 "off." The pulse is thus effectively propagated from flip-flop 40 to flip-flop 42. In the same manner the pulse is propagated on through flip-flops 44 and 46. The outputs of flip-flops 42, 44, and 46 are illustrated respectively by waveforms E, F and G of FIG. 4. For convenience, reference letters corresponding to waveforms in FIG. 4 have been placed on FIG. 2 at that point where the waveform occurs. The clocking pulse from clock 1 when passing through delay means 41 has been delayed an amount in time equal to the time necessary for the occurrence of two pulses of the master clock. It has also been synchronized, or made to coincide with, the occurrence of pulses from master clock 32.

Similarly as described above with regard to clock 1, clock 2 is propagated through flip-flop 50 and illustrated as J in FIG. 4. The output of "and" circuit 52 is illustrated as waveform K in FIG. 4 and can be designated clock 1a. The output of "and" circuit 56 is illustrated as waveform L for convenience and can be designated clock 1b. The output of "and" circuit 61 is illustrated as waveform M and is designated clock 2b.

Figure 2B:
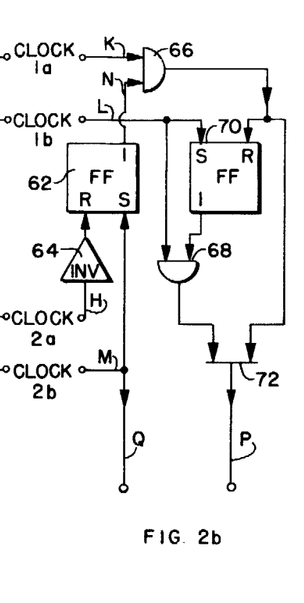

The output from "and" circuit 61 is a "core unload synchronizing pulse," and is illustrated as waveform Q. Clocks 1a, 1b, 2a, and 2b are fed to the balance of the system which is shown in FIG. 2b. There the output of "and" circuit 61 which is clock 2b is also fed to the "S" input of flip-flop 62. The output of "and" circuit 58 which is clock 2a and is illustrated as waveform H is fed to inverter 64 whose output is connected to the "R" input of flip-flop 62.

The output of flip-flop 62 which is illustrated by waveform N is fed to "and" circuit 66. Also fed to the input of "and" circuit 66 is the output of "and" circuit 52, waveform K, or designated as clock "1a." The output of "and" circuit 56, which is illustrated as waveform L and also identified as clock "1b" is fed to "and" circuit 68 and also to the "S" input of flip-flop 70. The output of "and" circuit 66 is fed to the "R" input of flip-flop 70 and to one of the inputs of "or" circuit 72. The outputs of flip-flop 70 is fed to one of the inputs to "and" circuit 68. "Or" circuit 72 is of a character to have an output such as waveform P for an input to either of its input taps. The output of "or" circuit 72 is designated "core load synchronizing pulse."

To briefly summarize, clock "1" is delayed by delay means 41, then gated with the master clock 32 to provide a delayed clock 1 which is labeled clock "1a." The amount of the delay in delay circuit 41 is about 10 microseconds for a master clock frequency of 200 kilocycles per second. Clock 1a (waveform E) is further delayed by delay means 45, and comes out as clock "1b." Clock 2 is gated with an inverted form of the master clock to obtain clock "2a." This clock 2a is delayed and gated with inverted master clock to get clock "2b." It is thus seen that none of these new clocks can be coincidental in time.

To further summarize, FIG. 2b shows how the system uses the new clocks to obtain the desired operation. Assuming that flip-flop 62 is in its "on" state, clock "1a" is not inhibited from passing through "and" circuit 66 to "or" circuit 72 to provide a core memory load synchronizing pulse. The trailing edge of the pulse from "and" circuit 66 will then reset flip-flop 70 to its "off" state. Clock "1b" is then inhibited from passing through "and" circuit 68 to "or" circuit 72 by the "off" condition of flip-flop 70. Clock 2b provides the core memory unload synchronizing pulse. Thus it is seen that in the present case clock "1a" provides a core load synchronizing pulse and clock "2b" provides a core unload synchronizing pulse.

In further explanation of the system, if a pulse from clock "2a" occurs slightly before a pulse from clock "1a," the leading edge of clock "2a" will reset flip-flop 62, which will remain reset until the trailing edge of clock 2b. During the interval that flip-flop 62 is "off," clock "1a" is inhibited from passing through "and" gate circuit 66 to provide the core load synchronizing pulse through "or" gate circuit 72. It also cannot reset flip-flop 70, the output of which will not inhibit clock "1b" from providing the required core load synchronizing pulse through "or" gate circuit 72. Thus it is seen that in this case clock "1b" will provide a core load synchronizing pulse and clock "2b" will provide a core unload synchronizing pulse. The occurrence of a pulse from clock "2b" will again set flip-flop 62, so its output will be "on" and the system is again ready for another sequence of events. As is clearly seen in FIG. 4, and particularly waveforms P and Q of FIG. 4, the core load synchronizing pulses and the core unload synchronizing pulses cannot occur simultaneously. Further, sufficient time elapses between a load and an unload pulse or between an unload and a load pulse to permit the core memory to recover from the first-occurring operation and be ready for the following operation. Typical core memory operating times may be of the order of from five to eight microseconds.

Figure 3A:
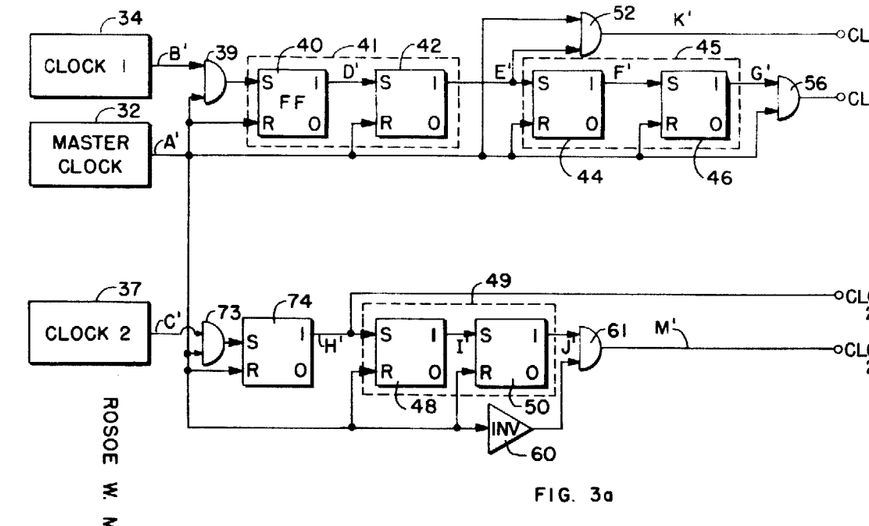
FIG. 3a and FIG. 3b, illustrates an alternate clocking system in which there are three clocks independent of each other.
Figure 3B:
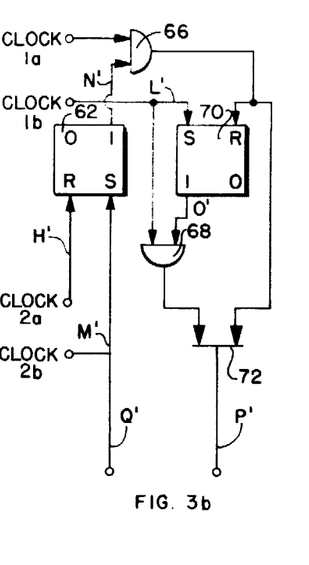

In some situations it is desired that there be three clocks which are independent of each other. Such a clocking system is shown in FIG. 3. For example, clock 1 of FIG. 3 can represent the clock recorded on the magnetic tape and controls the transfer of data to the core memory. The master clock is derived for example from a computer clock and is similar to the master clock described hereinbefore. However, clock 2 is independent of either clock 1 or the master clock and commands the transfer of data from the core memory. An example of such a situation is the transfer of data in binary form from magnetic tape to punched paper tape or punched cards where the clocking of data from the core memory must be controlled by the punching device.

The system illustrated in FIG. 3 is quite similar to that of FIG. 2. FIG. 3 additionally contains an "and" circuit 73 and flip-flops 74 and 48 which serve to "lock-in" clock 2 to the master clock. Flip-flops 48 and 50 make up a delay unit 49. The output of clock 2 is connected to the "S" input of flip-flop 74 through "and" circut 73. The master clock output is connected to the "R" input of flip-flop 74. The output of flip-flop 74 is connected to the "R" input of flip-flop 52 and to the "S" input of flip-flop 48.

Figure 5:
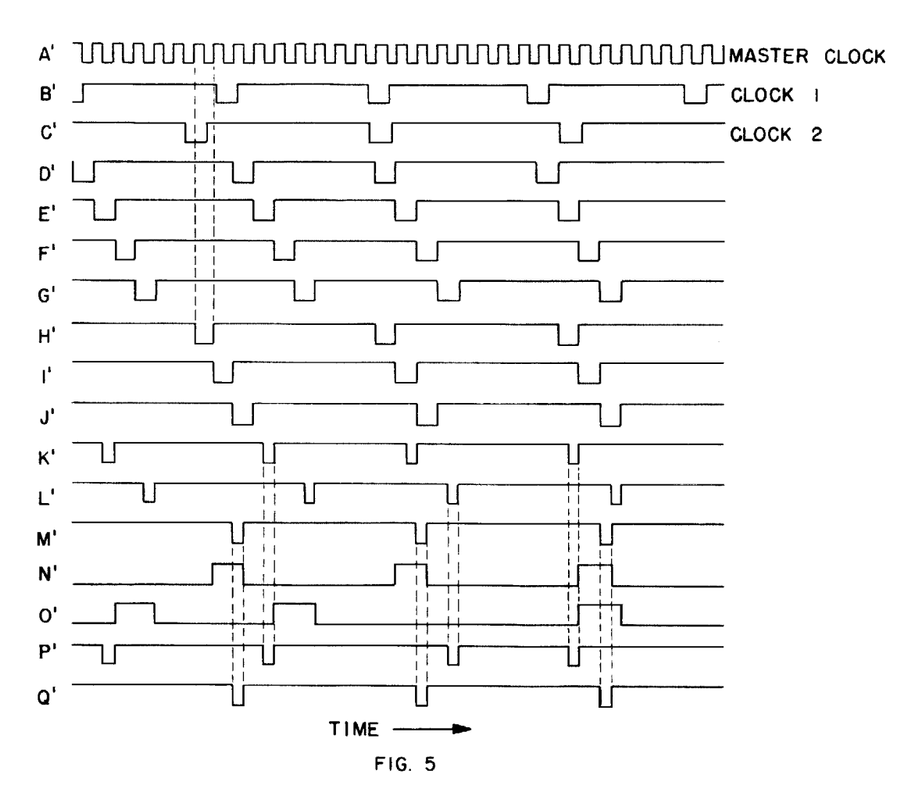
FIG. 5 illustrates various waveforms which occur at various points in the clocking system of FIG. 3.

FIG. 2b shows inverter 64 being fed to the "R" input of flip-flop 62. This inverter is not present in the system illustrated in FIG. 3, since the trailing edge of the pulse from flip-flop 74 has the same relative timing as the leading edge of the clock 2 pulse of FIG. 2a, and thus can be used without inversion to trigger the reset of flip-flop 62. In FIG. 2b, inverter 64 is inserted between the output of "and" circuit 58 and the "R" input of flip-flop 62. This permits flip-flop 62 to be reset by the leading edge of the clock "2a" pulse. In FIG. 3, clock 2 is independent of master clock 32. Attention will now be directed to a brief explanation of the operation of the system of FIG. 3. Reference is made to FIG. 5 which illustrates waveforms occurring at various points in the diagram of FIG. 3. The designation given the waveform in FIG. 5 is indicated on the drawing at the point where such waveform occurs.

The output of master clock 32 is designated A' on FIG. 5 and is fed to the reset input of flip-flops 40, 42, 44, 46, 74, 48 and 49; to "and" gates 56, 39, and 73, and to inverter 60. The output of clock 1 (34) is illustrated as waveform B' and is fed to the set input of flip-flop 40 through "and" gate 39. The output of clock 2 (37) is illustrated by C' and is fed to the set input of flip-flop 74 through "and" gate 73. In this system clock 1, clock 2 and the master clock are all independent. The trailing edge of a negative pulse from master clock 32 gated by a negative pulse from clock 1 (34) in "and" circuit 39 turns the flip-flop 40 "on" to have an output D'. The next occurring trailing edge of a negative pulse from the master clock (A') resets flip-flop 40. Thus the pulse represented by D' is turned on by the coincidence of a pulse from clock 1 and the master clock, and is cut off by the occurrence of a pulse from master clock 32. The trailing edge of the pulse represented by waveform D' turns flip-flop 42 on. However, it is not reset again until the next occurring trailing edge of the pulse of A'. Thus it is seen that the trailing edge of the pulse of E' is delayed from the trailing edge of the pulse D' by the time for one complete cycle of the pulse in waveform A' from the master clock. The waveform E' is fed to "and" gate 52 where it is gated with a negative pulse from master clock 32. The output of "and" gate 52 is illustrated in waveform K', and pulse E' in effect has been reduced in width by half yet retaining the same position time-wise for its trailing edge. The waveform K' is called collectively clock 1a.

Waveform E' also resets flip-flop 44 as can be seen. The pulses of waveform G' are identical to the waveform of F' except that they have been displaced to the right in time a distance equal to one complete cycle of the pulse train from master clock 32. Waveform G' is fed to "and" gate 56 to which also has been supplied the waveform A' from the master clock 32. The output of "and" gate 56 is waveform L'. As can be seen the trailing edge of the waveform of the pulses in waveform L' coincides with the trailing edge of the pulses of waveform G'. However, the leading edge of the pulses in waveform L' coincides with the leading edge of a pulse in waveform A'. To put it differently, waveform G' has been operated upon to cut the duration of its pulses in half while maintaining the trailing edge constant in time. Waveform L' is called clock 1b.

Clock 2 (37) is designed so that the duration of its output pulses are slightly shorter than one complete cycle of the master clock pulse train. The output from clock 2 (37), illustrated as waveform C', is fed to the set input of flip-flop 74 after being gated with the master clock in "and" circuit 73. Flip-flop 74 is reset by the output of the master clock 32. The output of flip-flop 74 is illustrated as waveform H'. The "and" gate 73 assures that flip-flop 74 will be set or tuned on for a time sufficient for operating the following flip-flop 48. Waveform H', which is also called clock 2a, is fed to the set input of flip-flop 48 which is reset by the master clock. Thus the output of flip-flop 48 is represented by the waveform I' whose pulses have a leading edge which is coincident in time with the trailing edge of the pulses of waveform H and whose width is essentially twice the width of the pulse of the waveform A' of the master clock. Waveform I' is operated upon by flip-flop 50 to obtain waveform J'. Waveform J' has pulses which are essentially identical to those of I' except that they have been displaced in time a distance equal to the width of the pulses of waveform I'. Waveform J' is fed to "and" gate 61 to which is also fed the inverted signal from the master clock. "And" gate 61 passes a signal from the simultaneous occurrence of the pulse from waveform J' and the occurrence of the waveform from inverted waveform A'. By inverting the waveform of the master clock the output J' is converted to a waveform M' whose leading edge occurs simultaneously with leading edge of signal J' but its trailing edge leads the trailing edge by one-half the width of the pulse J'. Waveform M', which is the output from "and" gate 61, is labeled clock 2b, and is fed to the set input of flip-flop 62. Waveform H', which is the output of flip-flop 74, is fed to the reset input of flip-flop 62. The output of flip-flop 62 then is N' which has pulses whose trailing edge occurs in time with the trailing edge of the pulse of waveform H' and whose leading edge occurs simultaneously with the trailing edge of the pulse of waveform M'. Waveform Q' is tapped from waveform M' and is identical therewith and is one of the end products sought; that is, an unload synchronizing pulse. Pulse N' is fed to "and" gate 66 as is also waveform K'. K' can pass through "and" gate 66 only during the occurrence of a negative pulse of N'. This pulse from "and" gate 66 is fed to "or" gate 72 and is passed therethrough as waveform P'. However, the pulses of waveform P' can occur from simultaneous occurrence of a negative pulse in the waveform of L' and the waveform O'. The waveform from "and" circuit 66 is fed to the reset input of flip-flop 70 and the output of "and" circuit 56, which is illustrated waveform L', is fed to the set input of flip-flop 70. The output of flip-flop 70 is waveform O'. On the simultaneous occurrence of the pulses of waveform O' and the pulses of waveform L' "and" gate 68 passes a pulse therethrough. This pulse then passes through "or" gate 72 to supply pulses to waveform P' to obtain the load synchronizing pulses. The operation of flip-flops 62 and 70, "and" circuits 66 and 68, and "or" circuit 72 is identical to the operation of similarly-numbered components as hereinbefore described in conjunction with FIG. 2b.

While there are above disclosed but a limited number of embodiments of the structure of the invention herein presented, it is possible to produce still other embodiments without departing from the inventive concept herein disclosed. It is therefore desired that only such limitations be imposed on the appended claims as are stated therein.

What is claimed is:

1. A digital clocking system which comprises: a master clock; a first clock which is independent of said master clock; a second clock dependent from said master clock; a first flip-flop, a second flip-flop, a third flip-flop, a fourth flip-flop, and a fifth flip-flop, each of said flip-flops having a set input and a reset input and a true output; means electrically connecting the output of said master clock with the reset input of each of said first, second, third, fourth, and fifth flip-flops; means electrically connecting said first clock with the set input of said first flip-flop; means electrically connecting the one output of said first flip-flop with the set input of said second flip-flop; means electrically connecting the output of said second flip-flop with the set input of said third flip-flop; means electrically connecting the output of said third flip-flop with the set input of said fourth flip-flop; a first "and" circuit having two inputs, the first input being electrically connected to the output of said second flip-flop and the second input being electrically connected to said master clock; a second "and" gate having two inputs, one being electrically connected to the output of said fourth flip-flop and the other input being electrically connected to said master clock; means electrically connecting the set input of said fifth flip-flop with the output of the said second clock; a first inverter electrically connected to the output of said master clock; a third "and" gate whose first input is electrically connected to the output of said fifth flip-flop and the other input connected to the output of said first inverter; a fourth "and" circuit having two inputs, the first input being electrically connected to the output of said first inverter and the other input being electrically connected to the second clock; a sixth flip-flop and a seventh flip-flop; each of said sixth and seventh flip-flops having a set input and a reset input and an output; a second inverter; means electrically connecting the output of said fourth "and" gate to the input of said second inverter; circuit means electrically connecting the output of said third "and" gate to the "set" input of said sixth flip-flop, such circuit means having a tap for taking off a signal; means electrically connecting the output of said second inverter to the reset input of said seventh flip-flop; a fifth "and" gate having two inputs, one input being connected to the output of said sixth flip-flop and the other input being electrically connected to the output of said first "and" gate; a sixth "and" gate having two inputs, one input being electrically connected to the output of said second "and" gate and the other "and" gate being electrically connected to the output of said seventh flip-flop; an "or" gate having two inputs, one being connected to the output of said sixth "and" gate and the other being connected to the output of said fifth "and" gate.

2. A clocking system for obtaining first output clocking pulses which do not occur simultaneously with second output pulses, said pulses being derived from a master clock, clock 1 which is independent of the master clock and clock 2 which is dependent from the master clock which comprises:

first means for causing the pulses of clock 1 to occur at a known time with respect to master clock;
second means for delaying the pulses from said first means by an amount equal to one period of the master clock;
third means to gate the pulses from said second means with the master clock to obtain pulses which occur during the occurrence of pulses of the master clock to obtain a first delayed clock 1;
fourth means for delaying said first delayed clock an additional amount equal to one period of the master clock;
fifth means to gate the pulses from said fourth means with the master clock to provide pulses which occur during the occurrence of pulses of the master clock to obtain a second delayed clock 1;
sixth means for gating clock 2 with the master clock such that the pulses of clock 2 occur only during the occurrence of pulses of the inverted master clock to obtain a gated clock 2;
seventh means for delaying said gated clock 2 a selected amount equal in time to one period of the master clock to obtain a delayed clock 2;
eighth means for inhibiting said first delayed clock when it occurs during the interval from the start of a pulse of gated clock 2 to the end of a pulse of said delayed clock 2;
ninth means for inhibiting said second delayed clock whenever first delayed clock is not inhibited by said eighth means;
tenth means for gating said first delayed clock when not inhibited by said eighth means and for gating said second delayed clock when said first delayed clock is inhibited by said eighth means to provide an output clocking pulse which does not occur simultaneously with the second output pulse coincident in time with delayed clock 2.

3. A clocking system for obtaining first output clocking pulses which do not occur simultaneously with second output pulses, said pulses being derived from a master clock, clock 1 which is independent of the master clock and clock 2 which is also independent of the master clock, which comprises:

first means for causing the pulses of clock 1 to occur at a known time with respect to master clock;
second means for delaying the pulses from said first means by an amount equal to one period of the master clock;
third means to gate the pulses from said second means with the master clock to obtain pulses which occur during the occurrence of pulses of the master clock, gates to obtain a first delayed clock 1;
fourth means for delaying said first delayed clock an additional amount equal to one period of the master clock;
fifth means to gate the pulses from said fourth means with the master clock to provide pulses which occur during the occurrence of pulses of the master clock to obtain a second delayed clock 1;
sixth means for causing the pulses of clock 2 to occur at a known time with respect to the master clock;
seventh means for delaying the pulses from said sixth means a selected amount equal in time to one period of the master clock to obtain a delayed clock 2;
eighth means for inhibiting said first delayed clock when it occurs during the interval from the end of a pulse from said sixth means to the end of a pulse of said delayed clock 2;
ninth means for inhibiting said second delayed clock whenever first delayed clock is not inhibited by said eighth means;
tenth means for gating said first delayed clock when not inhibited by said eighth means and for gating said second delayed clock when said first delayed clock is inhibited by said eighth means to provide an output clocking pulse which does not occur simultaneously with the second output pulse coincident in time with delayed clock 2.

4. A clocking system for use with a master clock having a train of alternating pulses of approximately equal duration, a clock 1 having pulses whose frequency of occurrence is less than the ocurrence of the pulses of the master clock, and a clock 2 whose pulses are derived from and occur at a lower frequency than said master clock; the combination which comprises:

a first means to reform the pulses of clock 1 such that two new pulses are formed for each pulse of clock 1 and which are separated in time and occur during the occurrence of pulses of one polarity from the master clock;
a second means to reform the pulses of clock 2 such that two new pulses are formed for each pulse of clock 2 and which are separated in time and occur during the occurrence of pulses of the other polarity from the master clock;
a third means to select the second occurring pulse of the two pulses from said first means during the interval from the start of the first pulse from said second means to the end of the second pulse from said second means, and
a fourth means to select the first occurring pulse from the two pulses of said first means at all other times such that the second occurring pulse from said second means is separated in time from a pulse from said third means by at least one full period of the pulses from said master clock.

5. A system for obtaining a load synchronizing pulse train and an unload synchronizing pulse train from a master clock, a clock 1 and a clock 2, in which each clock is independent of the other clocks which comprises: a first flip-flop; a second flip-flop; a third flip-flop; a fourth flip-flop; a fifth flip-flop; a sixth flip-flop; a seventh flip-flop; an eighth flip-flop; and a ninth flip-flop; each said flip-flop having a set input and a reset input and an output; a first "and" gate; a second "and" gate; a third "and" gate; a fourth "and" gate; a fifth "and" gate; a sixth "and" gate and a seventh "and" gate; each said "and" gate having two inputs and an output, an output pulse occurring upon the simultaneous energization of the two inputs; means electrically connecting the output of said master clock with the reset input of said first, second, third, fourth, sixth, seventh and eighth flip-flop and one input of each of said first "and" gate, said second "and" gate, and said fifth "and" gate; an inverter; means connecting said master clock with said inverter; means electrically connecting the output of said clock 1 with one of the inputs of said first "and" gate; means electrically connecting the output of said first "and" gate with the said "set" input of said first flip-flop; means electrically connecting the output of said first flip-flop with the "set" input of second flip-flop; means electrically connecting the output of said second flip-flop with the set input of said third flip-flop and with one of the inputs of said third "and" gate; means electrically connecting the output of said third "and" gate with one of the inputs of said fourth "and" gate; means electrically connecting the output of said third flip-flop with the "set" input of said fourth flip-flop; means electrically connecting the output of said fourth flip-flop with one of the inputs of said fifth "and" gates; means electrically connecting the output of clock 2 with one of the inputs of said second "and" gate; means electrically connecting the output of said second "and" gate with the "set" input of said sixth flip-flop; means electrically connecting the output of said sixth flip-flop with the set input of said seventh flip-flop and with the reset input of said ninth flip-flop; means electrically connecting the output of said seventh flip-flop with the set input of the eighth flip-flop; means electrically connecting the output of said eighth flip-flop with one of the inputs of said seventh "and" gate; means electrically connecting the output of said inverter with one of the inputs of said seventh "and" gate; means connecting the output of said seventh "and" gate with the "set" input of said ninth flip-flop; and means for tapping off an unload synchronizing pulse from the output of said seventh "and" gate; means electrically connecting the output of said ninth flip-flop with one of the inputs of said fourth "and" gate; means electrically connecting the output of said fourth "and" gate to the "reset" input of said fifth flip-flop; an "or" gate; means electrically connecting the output of said fourth "and" gate with one of the inputs of said "or" gate; means electrically connecting the output of said fifth "and" gate to the set input of said fifth flip-flop and with one of the inputs of said sixth "and" gate; means electrically connecting the output of said fifth flip-flop with one of the inputs of said sixth "and" gate; means electrically connecting the output of said sixth "and" gate with one of the inputs of said "or" gate; and means to tap off the output from said "or" gate to obtain a load synchronizing pulse.

6. A clocking system comprising:
   a master clock having a train of alternating pulses of approximately equal duration;
   a clock 1 having pulses the frequency of occurrence of which is less than the frequency of occurrence of the pulses of the master clock;
   a clock 2 having pulses with a frequency of occurrence less than that of the master clock and different from the frequency of occurrence of clock 1;
   first means to reform the pulses of clock 1 such that its pulses occur during the occurrence of a pulse of one polarity of the master clock;
   second means to reform the pulses of clock 2 such that its pulses occur during the occurrence of a pulse of the other polarity of the master clock; and
   means connected to said first means and said second means to separate the reformed pulses of clock 1 from the reformed pulses of clock 2 by at least one period of the master clock.

References Cited by the Examiner

Page 167, 1961, Fundamental Principles of Switching Circuits and Systems, American Telephone and Telegraph Company. FIGURES 10–14.

ROBERT C. BAILEY, *Primary Examiner.*

MALCOLM A. MORRISON, *Examiner.*

P. L. BERGER, *Assistant Examiner.*